United States Patent
Marco (10) Patent No.: US 6,266,337 B1
(45) Date of Patent: Jul. 24, 2001

(54) PACKET RETRANSMISSION ELIMINATOR

(75) Inventor: Talmon Marco, Herzliya (IL)

(73) Assignee: Expand Network Ltd., Tel Aviv (IL)

( * ) Notice: Subject to any disclaimer, the term of this patent is extended or adjusted under 35 U.S.C. 154(b) by 0 days.

(21) Appl. No.: 09/103,621

(22) Filed: Jun. 23, 1998

(51) Int. Cl.[7] .............................. H04L 12/28; H04L 12/56
(52) U.S. Cl. ............................................ 370/410; 370/477
(58) Field of Search ................................. 370/229, 230, 370/231, 235, 236, 389, 400, 401, 410, 352, 477; 714/748

(56) References Cited

U.S. PATENT DOCUMENTS

| | | | |
|---|---|---|---|
| 5,222,061 | * 6/1993 | Doshi et al. | 370/394 |
| 5,487,068 | * 1/1996 | Smolinske et al. | 370/450 |
| 5,608,729 | * 3/1997 | Orsic | 370/445 |
| 5,627,970 | * 5/1997 | Keshav | 709/233 |
| 5,751,719 | * 5/1998 | Chen et al. | 370/473 |
| 5,878,041 | * 3/1999 | Yamanaka et al. | 370/394 |

* cited by examiner

*Primary Examiner*—Ajit Patel
*Assistant Examiner*—Bob A. Phunkult
(74) *Attorney, Agent, or Firm*—Mark M. Friedman (57) ABSTRACT

A packet retransmission eliminator is installed on opposite ends of a path in a network. Each original packet sent over the path is cached on the transmitting and the receiving ends of the path. Retransmitted packets that are to be sent over the path are intercepted and replaced with a substitute retransmission packet. In response to a received retransmission packet, the receiving end retransmits the original packet using the corresponding packet that was previously stored in the cache.

25 Claims, 6 Drawing Sheets

PACKET RETRANSMISSION ELIMINATOR

FIELD OF THE INVENTION

The present invention relates to packet transmission systems and, more specifically, to a system and method for reducing overhead associated with packet retransmissions in a packet-based network.

BACKGROUND OF THE INVENTION

Packet-based communication networks (such as the Internet) transfer information between computers and other equipment using a data transmission format known as packetized data. The stream of data from a data source (e.g., a host computer) is divided into variable or fixed length "chunks" of data (i.e., packets). Switches (e.g. routers) in the network route the packets from the data source to the appropriate data destination. In many cases, the packets may be relayed through several routers before they reach their destination. Once the packets reach their destination, they are reassembled to regenerate the stream of data.

Conventional packet-based networks use a variety of protocols to control data transfer throughout a network. For example, the Internet Protocol ("IP") defines procedures for routing data through a network. To this end, IP specifies that the data is organized into frames, each of which includes an IP header and associated data. The routers in the network use the information in the IP header to forward the packet through the network. In the IP vernacular, each router-to-router link is referred to as a hop.

The Transmission Control Protocol ("TCP") defines additional functions such as data flow control and reliable data transfer. TCP specifies that the data is organized into segments, each of which includes a TCP header and associated data. TCP specifies that a destination must acknowledge segments that it successfully receives. Thus, after the destination receives a segments that has not been corrupted in transit and all previous packets were received, the destination sends an acknowledgment message to the source. In simplified terms, if the source does not receive an acknowledgment within a predefined period of time, the source retransmits the segment. (There are additional situations in which TCP will initiate a retransmission. Inasmuch as these situation are well known in the art, they will not be discussed in detail here.)

Retransmission schemes used by protocols such as TCP, while generally effective, reduce the usable bandwidth of the network. That is, the resources of the network are essentially wasted when they are used to transmit data that has previously been transmitted. Due to ever increasing demand for network bandwidth and the relatively high cost of providing additional bandwidth in conventional data networks, a need exists for a method of compensating for losses in the effective bandwidth of data networks.

SUMMARY OF THE INVENTION

The invention provides a method of reducing data traffic associated with the retransmission of packets over a predefined path in an IP-based network. The predefined path does not include the final destination of the packet Thus, packets that were successfully transmitted over the predefined path, might not successfully reach the final destination. In this case, the source of the packet (e.g., a host computer) may attempt to retransmit the packet through the network via the predefined path.

In accordance with one embodiment of the invention, packets to be transmitted over the predefined path are analyzed to determine whether they have been previously sent over the path. If so, a retransmission message is sent over the path instead of the packet. When a retransmission message is received at the other end of the path, the actual packet (which was stored in a data memory during the prior transmission) is retrieved from the data memory and routed to the final destination in the usual manner.

In one embodiment, the invention is implemented using devices installed on each end of an IP hop. For example, the devices may be installed between the routers on each end of the IP hop. The device on the sending end of the hop intercepts each packet that the router sends over the hop. A packet that was not previously sent over the hop is copied into a cache and sent over the hop intact. On the other hand, when the incoming packet was previously sent over the hop, the device sends a retransmission packet instead of the packet. The retransmission packet includes information that identifies the packet being retransmitted.

The device on the other end of the hop intercepts each packet coming from the hop. When the incoming packet is not a retransmission packet, the device copies the packet to a cache and passes the packet to the router on that end of the hop. When the packet is a retransmission packet, the device retrieves the corresponding packet from the cache and sends that packet to the router.

In another embodiment, the method of the invention is implemented by installing appropriate software modules in the equipment (e.g., routers) on the ends of the path. The equipment is configured so that packets are processed as above and stored in the internal memory of the equipment, as necessary.

A system utilizing the teachings of the invention may provide additional data throughput because it typically will be more efficient to send a retransmission packet (which might not contain any data) instead of the entire packet (which may contain hundreds of bytes of data).

BRIEF DESCRIPTION OF THE DRAWINGS

These and other features of the invention will become apparent from the following description and claims, when taken with the accompanying drawings, wherein similar reference characters refer to similar elements throughout and in which:

DESCRIPTION OF EXEMPLARY EMBODIMENTS

Figure 1:
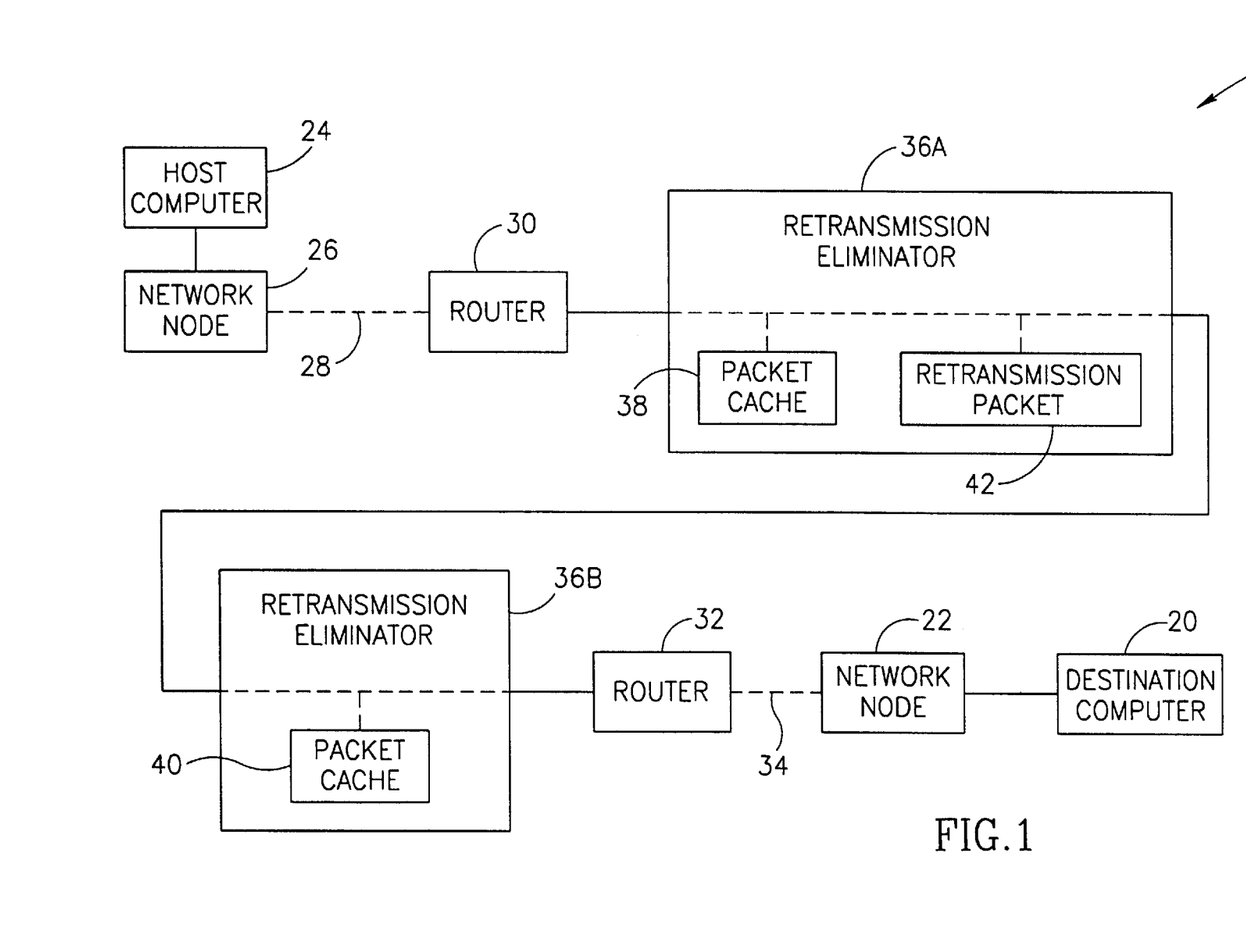
FIG. 1 is a block diagram of one embodiment of a data network incorporating a retransmission elimination system in accordance with the invention.

FIG. 1 illustrates one embodiment of the invention implemented in an IP hop within a network N. A destination computer 20 (lower right) connected to one node 22 in the network N requests data from a host computer 24 (upper left) connected to another node 26 in the network N. The host computer 24 routes data packets to the destination computer 20 via the network N. As represented by dashed line 28, the network N routes the packets to a router 30 at one end of the IP hop. Here, the dashed line indicates that the route between the network node and the router may pass through other nodes in the network. The router 30 sends these packets to another router 32 on the other end of the hop. As represented by dashed line 34, the network N routes the packets from the router 32 to the node 22, from which the packets are sent to the destination computer 20.

In accordance with one embodiment of the invention, retransmission eliminators 36A and 36B reduce the traffic associated with the retransmission of packets over the hop. The first time a packet is sent over the hop, the packet is stored in a cache 38 and 40 at each end of the hop. When the router 30 sends a packet over the hop, the retransmission eliminator 36A on that end of the hop compares the packet with the packets stored in the cache 38. When there is a match (i.e., when the packet is a retransmitted packet), the retransmission eliminator 36A sends a special retransmission packet 42 over the hop instead of the actual packet. The retransmission packet 42 includes information that uniquely identifies the packet.

On the other end of the hop, the retransmission eliminator 36B routes ordinary packets to other nodes in the network (e.g. node 22) in the usual manner. When the incoming packet is a retransmission packet 42, however, the retransmission eliminator 36B uses the information in the retransmission packet 42 to retrieve the corresponding packet from the cache 40. The retransmission eliminator 36B then sends this packet through the network N as above.

The advantages provided by the retransmission eliminators 36A and 36B may be better understood by way of example. In a typical implementation, the hop from router 30 to router 32 may be a relatively reliable long-distance link. In contrast, the portion of the network from the destination computer 20 to the network node 22 may be a relatively unreliable local network. In addition, the long-distance link is expensive relative to the local network. That is, the cost of transmitting packets over the long-distance link (e.g., the price charged by the provider of the long-distance link) is higher than the cost of transmitting packets over the local network.

Given the above scenario, it is more likely that packets will be "lost" on the local network than the IP hop. When a packet is "lost," the packet source (e.g., host computer 24) attempts to retransmit the packet over the expensive long-distance link (i.e., the hop). The retransmission eliminator 36A, however, intercepts the packet and, instead, only sends a relatively small retransmission packet 42 over the expensive link. The retransmission eliminator 36B on the local network side of the hop then retrieves and sends the actual packet to the destination computer 20. Thus, the retransmission eliminators 36A and 36B reduce the traffic on the relatively expensive link (i.e., the hop) thereby reducing transmission costs.

Figure 2:
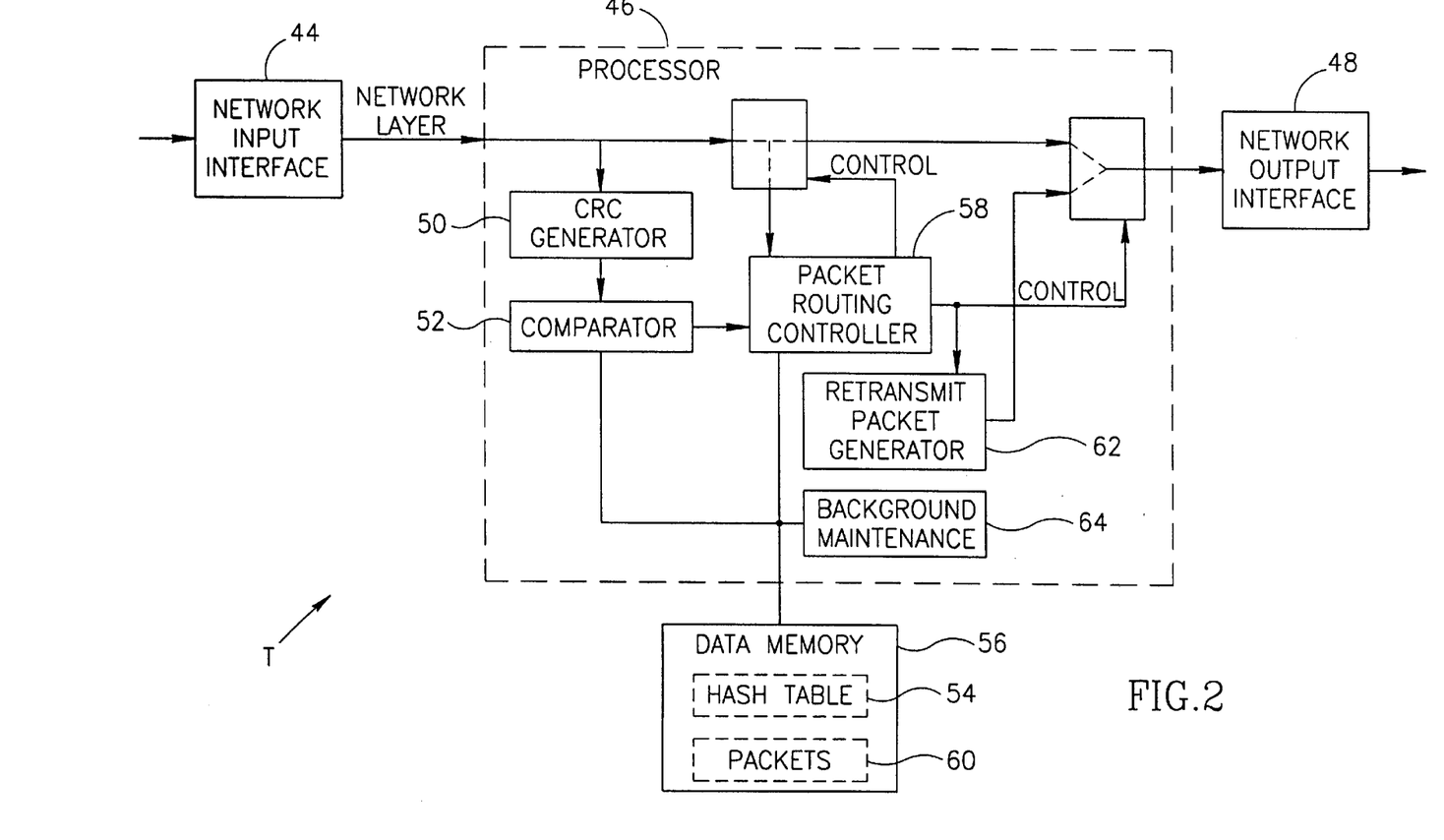
FIG. 2 is a block diagram of a transmit section of one embodiment of a retransmission elimination system constructed according to the invention.
Figure 3:
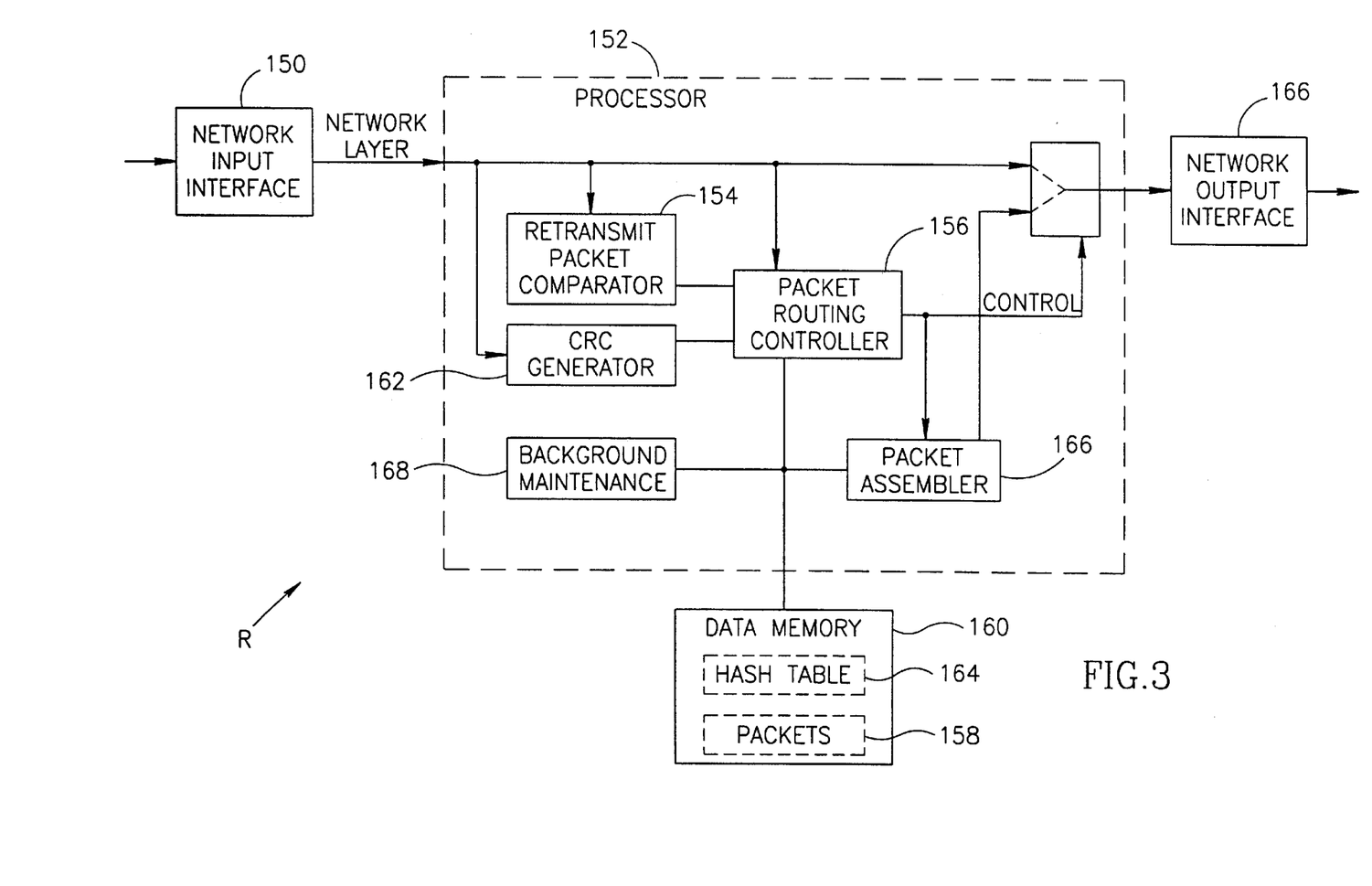
FIG. 3 is a block diagram of receive section of one embodiment of a retransmission elimination system constructed according to the invention.
Figure 4:
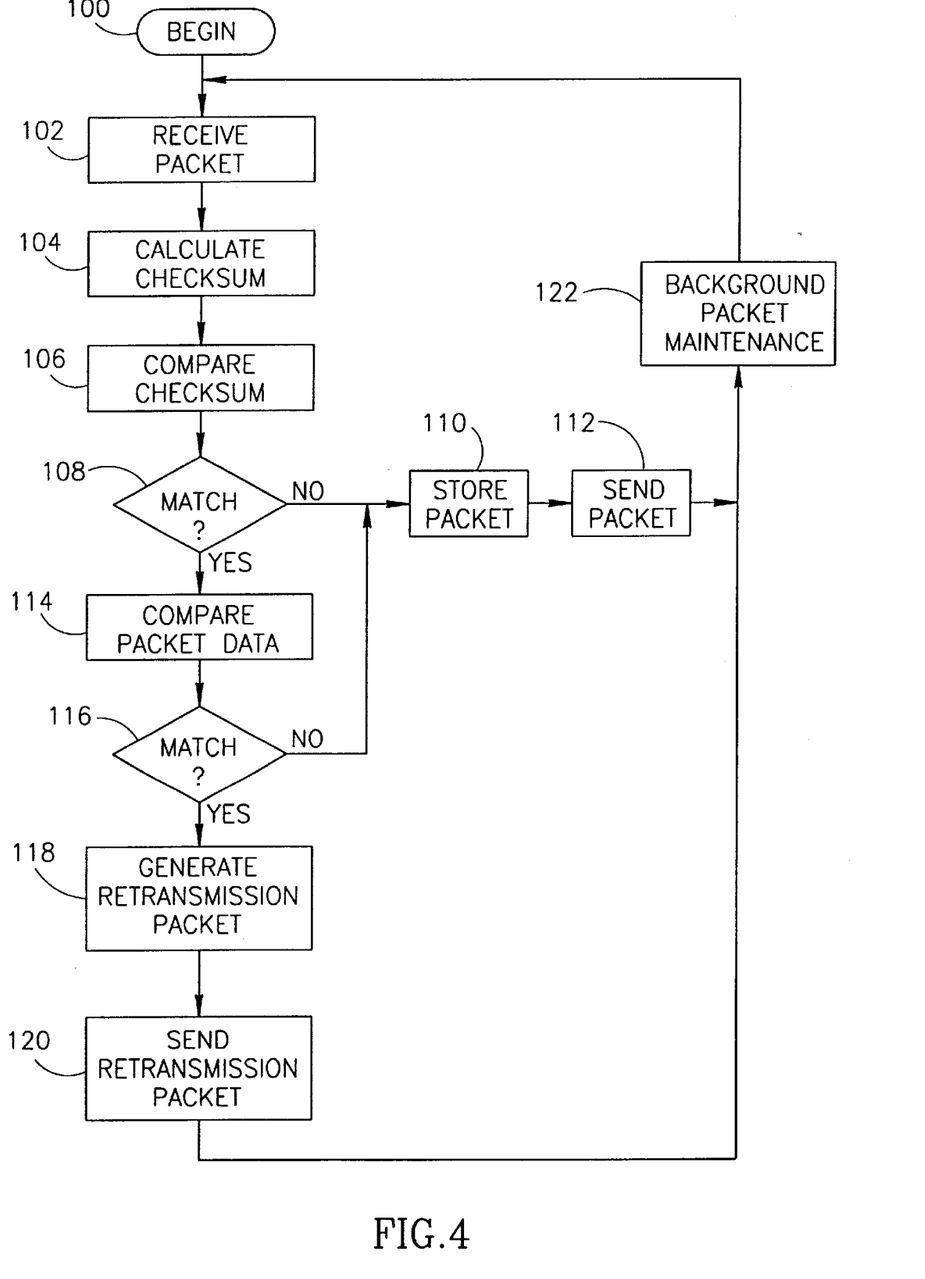
FIG. 4 is a flowchart of transmit operations that may be performed by a retransmission elimination system implemented according to the invention.
Figure 5:
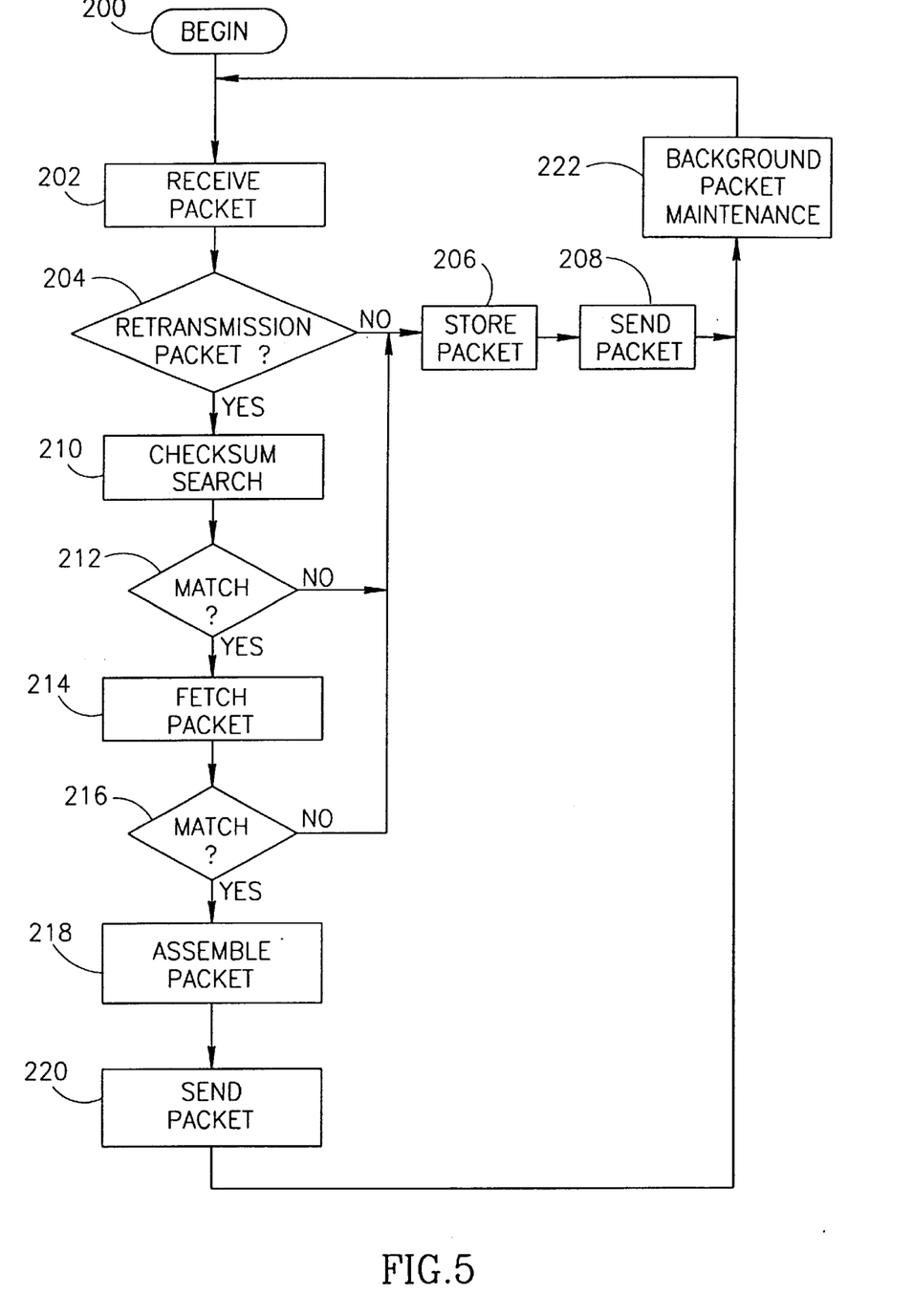
FIG. 5 is a flowchart of receive operations that may be performed by a retransmission elimination system implemented according to the invention.

With the above high-level description in mind, the details of one embodiment of the invention will be treated in conjunction with FIGS. 2–5. FIGS. 2 and 3 are block diagrams of transmit and receive sections, respectively, of a device that is installed in the network N. FIGS. 4 and 5 are flowcharts that describe exemplary operations of the transmit and receive sections, respectively.

In FIG. 2, a transmit section T of a retransmission eliminator 36 processes an incoming data stream of packets to be sent over the hop. A network input interface 44 (left) terminates the physical and data link layers and provides network layer (IP) packets to a processor 46. When the retransmission eliminators 36 are installed between the routers 30 and 32, the network interfaces 44 and 48 interface with a wide area network ("WAN") as described above. In some embodiments, a retransmission eliminator 36 may be installed farther up the link (i.e., before the router 30). In this case, one or more of the network interfaces 44 may connect to a local area network ("LAN"). The network interface in this type of system will include a LAN-type interface such as Ethernet. Details of the operation and implementation of a network input interface are well known in the IP data networking art.

The processor 46 illustrated in FIG. 2 includes several logical components. The operations of these components are described in conjunction with FIG. 4 beginning at block 100.

At block 102, the processor 46 receives an IP packet from the interface 44. Next, a CRC generator 50 computes the checksum of the packet (block 104). The checksum is generated, for example, using standard 32 bit cyclic redundancy checking ("CRC-32"). However, the checksum calculated here excludes the packet header fields that are likely to be different in a packet that was retransmitted. Excluded fields may include, for example, the identifier and the time-to-live fields. Thus, the calculated checksum most likely differs from the checksum that is included in the header of the packet.

A comparator 52 compares the calculated checksum with the checksums stored in a hash table 54 in a data memory 56 (block 106). At block 108, if no match for the checksum is found, the comparator 52 sends an appropriate signal to a packet routing controller 58. In response, the packet routing controller 58 causes a copy of the packet data 60 to be stored in the data memory 56 (block 110). In addition, the packet routing controller 58 causes a copy of the checksum and a pointer to the packet data to be stored in the hash table 54. At block 112, the packet routing controller 58 causes the original packet to be routed to a network output interface 48.

If, at block 108, a matching checksum is found, at block 114 the comparator 52 compares the data from the incoming packet with the data associated with the stored checksum (i.e., the packet data 60 stored in the data memory 56 that is addressed by the pointer associated with the checksum from the hash table 54). This step is a double-check that verifies that the packet is a retransmitted packet. Such a double-check (or some other procedure) may be necessary because different packets may have identical checksums. However, due to the very low probability that different packets will have the same checksum, in some embodiments the double-check step may be omitted.

If, at block 116, the packet data does not match, the process proceeds to block 110 and performs the operations discussed above. Otherwise, the process proceeds to block 118.

In response to a match indication signal from the comparator 52, the packet routing controller 58 causes a retransmit packet generator 62 to generate a packet of the type "retransmission" (block 118). That is, the identifier field in the packet specifies that it is a retransmission packet. Encapsulated within this packet is a cache identifier which consists of the calculated checksum and any information that is likely to be different between the original and retransmitted packets. This may include, for example, the time-to-live and identifier fields.

At block 120, the packet routing controller 58 causes the retransmission packet to be sent to the network output interface 48. The network output interface 48 processes the network layer (IP) packets and provides the appropriate physical and data link layers to interface to the network N. Details of the operation and implementation of a network output interface are also well known in the IP data networking art.

As represented by block 122, the retransmission eliminator 36 typically performs several background maintenance routines. For example, due to the limited size of the cache (e.g., data memory 56) the retransmission eliminator 36 continually clears older packets (including data, checksums and pointers) from the cache. In one embodiment, a background maintenance component 64 routine periodically checks a timestamp that is stored in the hash table 54 along with the checksum. The timestamp indicates the time at which the packet was received by the retransmission eliminator 36. In this embodiment, the timestamp is generated and stored in conjunction with the operations discussed above in conjunction with block 110.

The transmit section T of the retransmission eliminator 36 (FIG. 2) routes packets over the hop (FIG. 1) to a receive section R of a retransmission eliminator 36 (FIG. 3) on the other end of the hop. In FIG. 3, a network input interface 150 terminates the physical and data link layers and provides network layer (IP) packets to a processor 152. The details of the operation and implementation of the network input interface 150 may be similar to those of the interface 44 discussed above in conjunction with FIG. 2.

Referring to FIG. 5 beginning at block 200, the operation of the processor 152 will now be treated in detail. At block 202, the processor 152 receives a packet from the input interface 150. A retransmit packet comparator 154 determines whether the incoming packet is of the type "retransmission" or "regular" (block 204) and sends an appropriate signal to a packet routing controller 156.

If the packet is a regular packet, the packet routing controller 156 causes a copy of the packet data 158 to be stored in a data memory 160 (block 206). In addition, the packet routing controller 156 causes a CRC generator 162 to compute the checksum of the packet. This is done in a similar manner as described above using CRC-32 and excluding packet header fields such as the identifier and the time-to-live fields. Then, the packet routing controller 162 causes a copy of the checksum and a pointer to the packet data to be stored in a hash table 164 in the data memory 160. At block 208, the packet routing controller 156 causes the inbound packet to be routed to a network output interface 166.

If, at block 204, the packet is a retransmission packet, the packet routing controller 156 searches the hash table 164 for a checksum that matches the one supplied in the retransmission packet (block 210). If there is not a match, the process proceeds to block 206 an performs the operations discussed above. Otherwise, at block 214, a packet assembler 166 retrieves the packet data 158 from the data memory 160. As above, the pointer associated with the checksum in the hash table 164 specifies the address of the appropriate packet data 158. At this stage of the process, a double-check may be performed to verify that the received packet data matches the stored packet data (block 216). Again, if there is not a match, the process proceeds to block 206. If, there is a match, the packet assembler 166 generates a packet by assembling the retrieved packet data 158, the information sent with the retransmission packet (e.g., identifier and time-to-live information), and the new checksum that is generated for this packet (block 218).

The packet routing controller 156 then causes the new packet to be sent to the network output interface 166 (block 220). The network output interface 166 processes the network layer (e.g., IP) packets and provides the appropriate physical and data link layers to interface to the network N in a similar manner as discussed above in conjunction with FIG. 2.

Also in a similar manner as discussed above in conjunction with FIG. 2, a background maintenance component 168 may perform cache maintenance and other functions (block 222). Thus, the background maintenance component 168 checks the timestamps stored with the checksum at block 206 and clears older packets to make room for newer ones.

Figure 6:
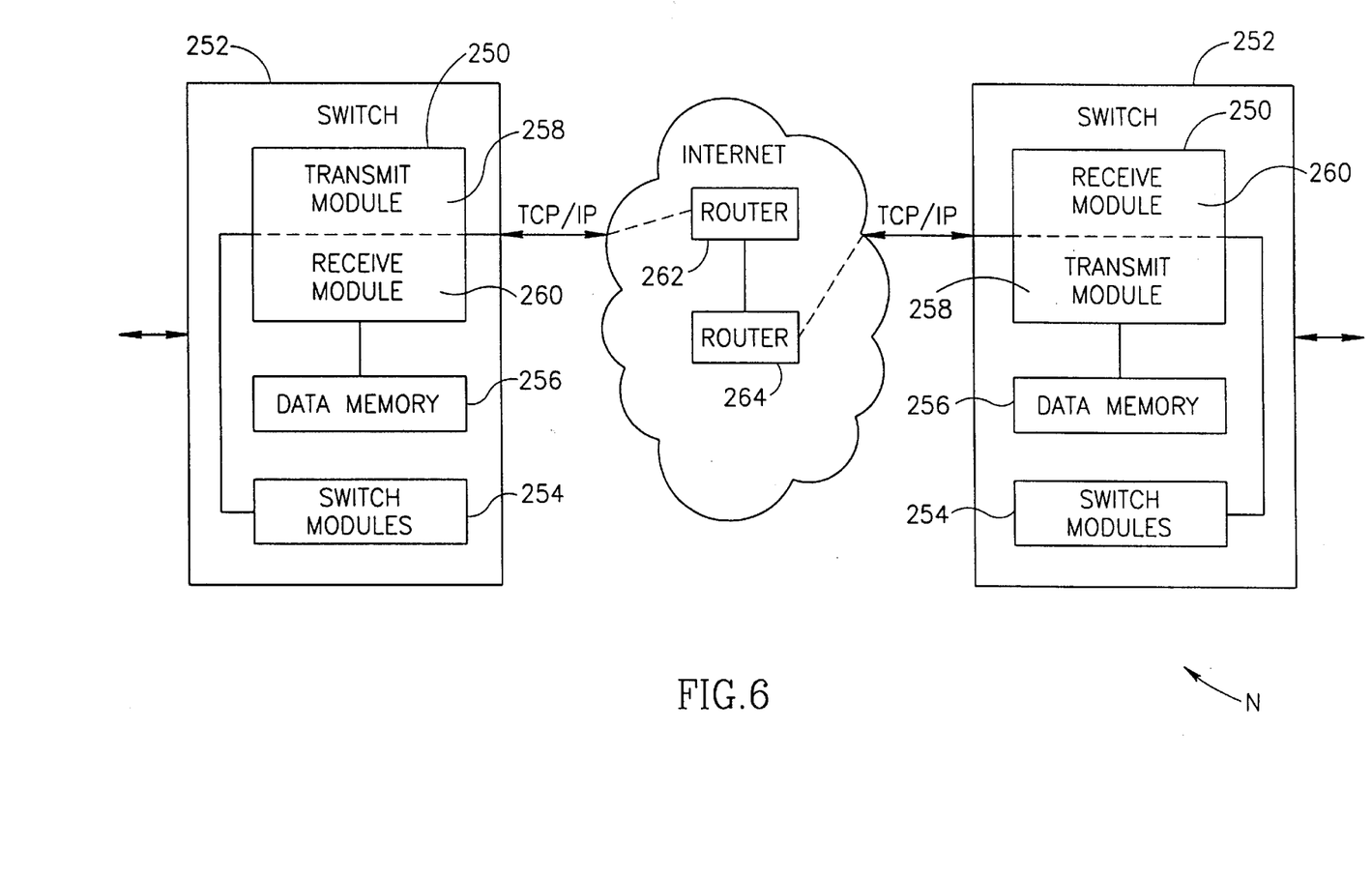
FIG. 6 is a block diagram of another embodiment of a data network incorporating retransmission elimination in accordance with the invention.

FIG. 6 illustrates an embodiment of the invention that is implemented by integrating software modules 250 into equipment 252 installed at each end of a predefined path in the network. The equipment 252 may consist of routers, bridges, modems or any other devices in the network N that handle packet traffic.

The packet retransmission processing operations performed by the embodiment of FIG. 6 are similar to those described above in conjunction with FIGS. 2–5. The retransmission software modules 250 are linked in with software modules 254 in the equipment 252 in a manner that enables the retransmission software modules 250 to intercept and process packets. A data memory 256 in the equipment may be used to store the packet data.

The retransmission software modules 250 may be implemented along the transmission path in the device where the packets are fully visible. For example, in practice the packets flowing through the network N may be encrypted. Thus, the retransmission software modules 250 are linked in to the switch modules 254 so that the retransmission software modules 250 have access to decrypted data.

In FIG. 6, the retransmission eliminator 250 is used on both sides of a duplex link. Thus, a transmit module 258 and a receive module 260 is installed in each switch 252. Accordingly, packet retransmission traffic is reduced for packet traffic that flows in either direction over the path.

FIG. 6 also illustrates that the invention may be used on more than a single IP hop. Here, the packets are routed through the network N which may cause the packets to be routed over other hops. For example, the hop between the two routers 262 and 264 shown. In this case, appropriate routing provisions are made to ensure that all retransmission packets are routed to the same receive module 260 at the other end of the path. This may include, for example, defining static routes using IP tunneling.

As discussed above, the path over which the retransmission eliminator is installed typically is a relatively reliable path. If this path is not reliable, an original packet might not reach the far end of the path. It may be seen that in this event, the original packet and not a retransmission packet should then be sent over the path.

Several different procedures may be implemented to account for possible failures on the hop. In one embodiment, the path is made reliable. This may involve, for example, using the reliability mechanism associated with TCP, HDLC (in its reliable mode) or PPP (in its reliable mode). In another embodiment, once the component on the receiving end of the path determines that the original packet was never received, a message is sent to the component on the originating side of the path to request transmission of the entire packet, rather than the retransmission packet. In another embodiment, packets are only stored in the cache for a predefined period of time (e.g., ten seconds) after the original packet is transmitted. When a packet is retransmitted after this time period elapses, the entire packet will be sent across the path (i.e., the system essentially operates as if this is the first time the packet was transmitted across the path).

From the above, it may be seen that the invention provides an effective method of reducing the overhead associated with packet retransmissions. In comparison to many traditional retransmission schemes, a system incorporating the teachings of the invention sends fewer packets over the path during retransmission. Because protocols such as TCP/IP are designed to continually adjust to the available throughput of their associated transmission links, the network will automatically use the additional bandwidth that results from less retransmission packet traffic. Accordingly, the system increases the effective bandwidth of the path.

In addition, a system incorporating the teachings of the invention may reduce the processing load on network resources. For example, because the retransmission devices on each end of a given path handle packet retransmissions over that path, the switches on the two ends of the path may not need to perform as many retransmission-related operations.

While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, the retransmission eliminator may be installed at various locations within the network. The invention may be implemented using a variety of hardware and software architectures. The teachings of the invention are applicable to numerous protocols in addition to those described above. A number of methods may be used to identify packets or to perform packet comparison operations. Other forms of cache identifiers may be used. These may include timestamps or other information that uniquely identifies the packet and is either sent with the packet or, as in the embodiment of FIGS. 2 and 3, generated independently by the transmit and receive sections of the retransmission eliminator using a predefined mechanism (e.g., a checksum). Thus, the specific structures and methods discussed in detail above are merely illustrative of a few specific embodiments of the invention.

What is claimed is:

1. A method of reducing data retransmissions over a path defined within a network, the method comprising the steps of:
   receiving, at a first end of the path, a packet to be transmitted to an opposite end of the path;
   determining by means of a first comparator whether said packet has previously been transmitted to said opposite end of the path;
   if said packet has not previously been transmitted, storing data of said packet in at least two data memories, a first data memory at said first end of the path and a second data memory at said opposite end of the path; and
   if said packet has previously been transmitted, employing a first packet routing controller, at said first end of the path, for sending a retransmission message instead of said packet to said opposite end of the path and similarly employing a second packet routing controller, at said opposite end of the path, to send previously stored packet data from said second of said at least two data memories to said opposite end of the path in response to said retransmission message thereby reducing data retransmissions.

2. The method of claim 1 further including the step of sending said packet to another end of the path if said packet has not previously been transmitted.

3. The method of claim 1 further including the steps of receiving said packet at the other end of the path and determining whether the packet received at the other end of the path is associated with the retransmission message.

4. The method of claim 3 further including the step of routing the packet received at the other end of the path in the event the packet received at the other end of the path is not associated with said a retransmission message.

5. The method of claim 1 wherein said step of storing includes the step of storing information associated with said packet in a data memory.

6. The method of claim 5 wherein the information comprises a checksum.

7. The method of claim 5 wherein the information comprises data from the packet.

8. The method of claim 1 wherein the determining step includes comparing data associated with the packet with data stored in a data memory.

9. The method of claim 8 wherein the data associated with the packet and the data stored in said data memory comprise checksums.

10. The method of claim 8 wherein the data associated with the packet and the data stored in said data memory comprise data from the packet.

11. The method of claim 1 wherein said retransmission message comprises a retransmission packet which comprises information that identifies said previously transmitted packet.

12. The method of claim 1 wherein the network comprises an IP-based network.

13. The method of claim 12 wherein the path comprises an IP hop.

14. A system for reducing data retransmissions over a path defined within a network, the system comprising:
   a network interface for receiving, at one end of the path, a packet to be transmitted to an opposite end of the path;
   a first comparator for determining whether said packet has previously been transmitted;
   a first data memory for storing packet data if said packet has not previously been transmitted;
   a first packet routing controller, at one end of the path, for sending a retransmission message instead of said packet to the opposite end of the path is said packet has previously been transmitted;
   a second data memory at said opposite end of the path for storing packet data in the event said packet has not previously been transmitted; and
   a second packet routing controller, at said opposite end of the path, for sending packet data from the second data memory in response to the retransmission message.

15. The system of claim 14 wherein said first packet routing controller sends the packet to another end of the path if said packet has not previously been transmitted.

16. The system of claim 14 further comprising a second network interface for receiving said packet at the other end of the path and a second comparator for determining whether the packet received at the other end of the path is associated with the retransmission message.

17. The system of claim 16 wherein the second packet routing controller routes the packet received at the other end of the path in the event the packet received at the other end of the path is not associated with said retransmission message.

18. The system of claim 14 wherein the information comprises a checksum.

19. The system of claim 14 wherein the information comprises data from the packet.

20. The system of claim 14 wherein the first comparator compares data associated with the packet with data stored in the second data memory.

21. The system of claim 20 wherein the data associated with the packet and the data stored in the data second memory comprise checksums.

22. The system of claim 20 wherein the data associated with the packet and the data stored in the second data memory comprise data from the packet.

23. The system of claim 14 wherein said retransmission message comprises a retransmission packet which comprises information that identifies said previously transmitted packet.

24. The system of claim 14 wherein the network comprises an IP-based network.

25. The system of claim 24 wherein the path comprises an IP hop.

* * * * *